N. K. BOWMAN.
CABLE GUIDE.
APPLICATION FILED APR. 29, 1918. RENEWED FEB. 18, 1920.
1,351,367.
Patented Aug. 31, 1920.
2 SHEETS—SHEET 1.
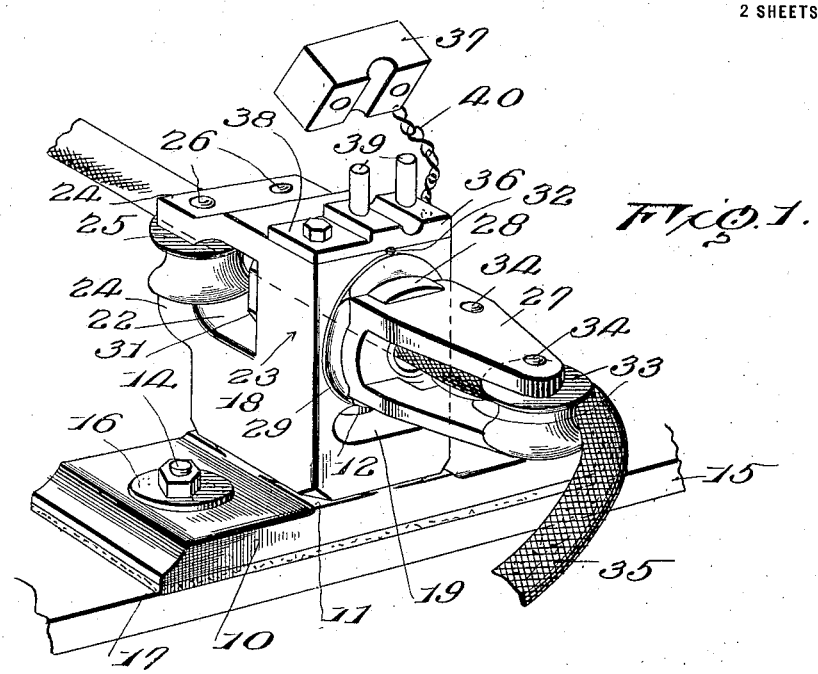
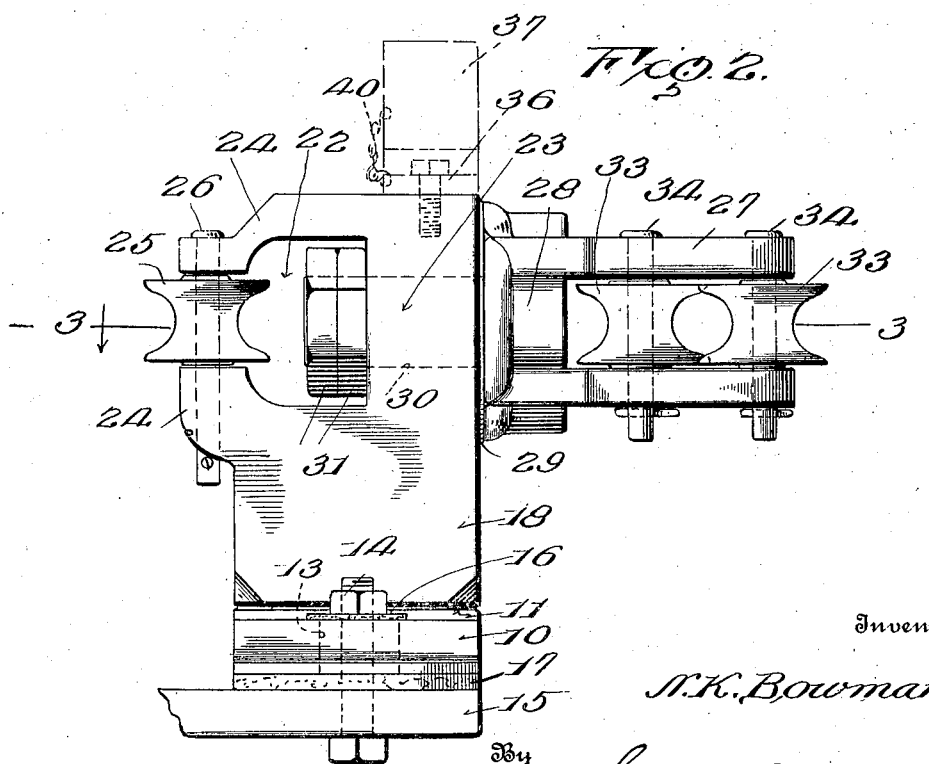
Inventor
N. K. Bowman
By Lacey & Lacey, Attorneys

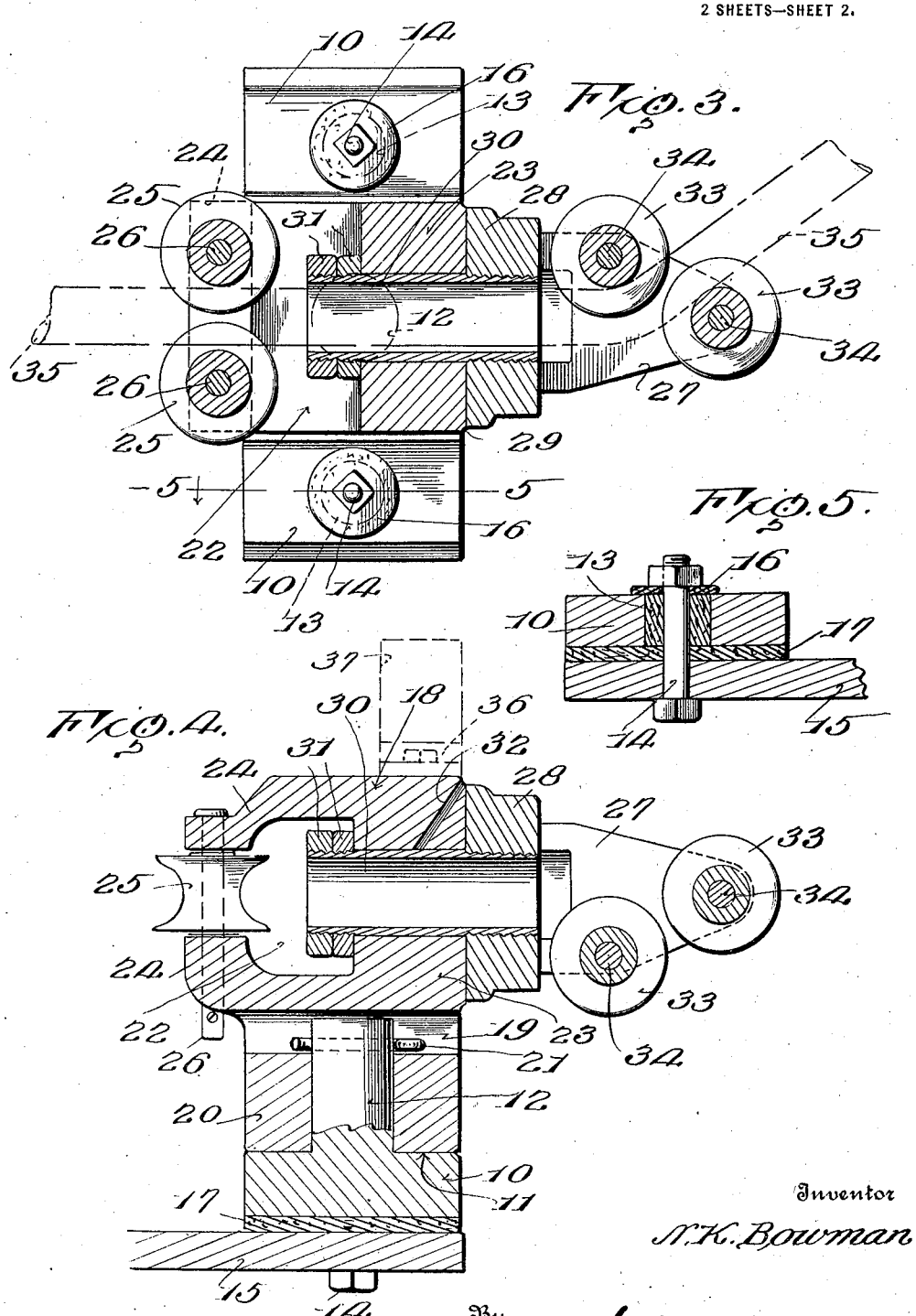

UNITED STATES PATENT OFFICE.

NEWTON K. BOWMAN, OF NORTH LAWRENCE, OHIO.

CABLE-GUIDE.

1,351,367. Specification of Letters Patent. Patented Aug. 31, 1920.

Application filed April 29, 1918, Serial No. 231,528. Renewed February 18, 1920. Serial No. 359,544.

*To all whom it may concern:*

Be it known that I, NEWTON K. BOWMAN, a citizen of the United States, residing at North Lawrence, in the county of Stark and State of Ohio, have invented certain new and useful Improvements in Cable-Guides, of which the following is a specification.

This invention relates to an improved cable guide for mining machines and gathering motors and has as its primary object to provide a device of this character which will automatically adjust itself to any direction from which the cable may be drawn.

The invention has as a further object to provide a guide wherein the base of the device will be electrically insulated with respect to its support so that metal guide rollers or sheaves may be employed upon the guide for receiving the cable, the use of such rollers, of course, tending to prolong the efficiency of the device.

And the invention has a still further object to provide a construction wherein the guide rollers or sheaves will be formed to fit the cylindrical shape of the cable so that the cable insulation will be worn evenly by the said guide rollers or sheaves, upon all sides of the cable.

Other and incidental objects will appear as the description proceeds. In the drawings wherein I have illustrated the preferred embodiment of the invention, and wherein similar reference characters designate corresponding parts throughout the several views:

Figure 1 is a perspective view of my improved cable guide and illustrating the manner in which a cable is threaded therethrough, Fig. 2 is a side elevation of the device, Fig. 3 is a horizontal section taken on the line 3—3 of Fig. 2 and looking in the direction of the arrows, this view particularly showing the swivel mounting of the guide yoke of the device.

Fig. 4 is a vertical sectional view particularly showing the swivel mounting of the body of the device to turn in a plane at right angles to the guide yoke, and Fig. 5 is a detail sectional view taken on the line 5—5 of Fig. 3 and looking in the direction of the arrows, this view particularly illustrating the manner in which the base of the device is insulated from its support.

In carrying out the invention I employ an elongated base 10 which is formed medially with a raised seat or bearing face 11. Upstanding from this seat axially thereof is a post or trunnion 12. Formed through opposite extremities of the base, medially thereof are suitable openings and tightly fitting in these openings are, as particularly shown in Fig. 5 of the drawings, bushings 13 of suitable insulating material. These bushings are adapted to removably receive bolts or other suitable fastening devices there through for connecting the base with its support, such support being conventionally illustrated in the drawings at 15. Bearing between the nuts of the bolts at their upper ends and the base 10 are washers 16 overlying the upper ends of the bushings 13. These washers are also formed of suitable insulating material, and disposed between the base and its support 15 is a plate 17. This plate, like the bushings 13 and washers 16, is formed of suitable insulating material so that the base is thus effectually electrically insulated with respect to its support.

Mounted upon the base is the body 18 of the guide. This body is preferably cast and, in its general shape, resembles an oblong block. Formed through the body adjacent its lower end is a transverse opening 19 defining a web 20 at the bottom end of the block and formed through this web axially of the body is a suitable opening which freely receives the post 12 of the base projecting into the opening 19 of the body. Connecting the body with the base to swivel upon the said post is a cotter pin or other suitable fastening device 21 inserted through the upper end of the post within the said opening. Adjacent its upper end the body 18 is, at the rear side of its vertical axis, formed with a transverse opening 22 disposed at substantially right angles to the opening 19 of the body. The opening 22 thus defines a web 23 at the forward side of the body and projecting rearwardly from the body above and below said opening are confronting laterally directed arms 24. Mounted between these arms in a plane medially of the opening are spaced horizontally disposed guide rollers or sheaves 25 journaled upon pivot pins 26 fitted through the said arms and preferably held in place by suitable cotter pins. The guide rollers 25 are constructed of metal and, as particularly shown in Figs. 1 and 3 of the drawings, are formed with deeply cut concave faces to fit around the circumference of a cable received therebetween.

Mounted upon the body 18 in a plane with the guide rollers 25 is a guide yoke 27 provided with a flanged annular base 28 confronting a slightly raised annular seat or bearing face 29 upon the forward side of the web 23 of the body. Threaded into the base 28 axially thereof is a hollow post or trunnion 30 journaled through a suitable opening in the said web and, at its inner end, receiving superposed nuts 31 threaded upon the trunnion within the opening 22 of the body for thus connecting the yoke with the body to swivel thereon. In this connection, it will be noted that the trunnion 30 is disposed in a vertical plane passing medially between the guide rollers 25 and formed through the web 23 of the body above the said trunnion is a suitable channel 32 into which lubricant may be introduced for lubricating the said trunnion. Mounted between the arms of the yoke are spaced guide rollers or sheaves 33 journaled upon pivot pins 34 extending through the said yoke arms and preferably held in place by suitable cotter pins. The guide rollers 33 are similar to the guide rollers 25 and are also constructed of metal, being formed with deeply cut concave faces as in the instance of the rollers 25, to fit around the circumference of a cable. As particularly brought out in Figs. 3 and 4 of the drawings, the outermost roller 33 is journaled in a plane intersecting the projected axis of the trunnion 30 of the yoke while the innermost roller 33 is journaled at a point in the rear of the first roller and at one side of the said projected axis.

As will now be clear, a cable, as conventionally illustrated at 35, may be threaded between the guide rollers 33 of the guide yoke through the hollow trunnion 30 of the said yoke and between the guide rollers 25 of the body 18 of the guide to a suitable spool therefor. Then, as the cable is wound upon the spool, the guide body may swivel upon the base 10 while the guide yoke may swivel upon the body of the guide in a plane at substantially right angles to the plane of movement of the guide body so that the guide will readily adjust itself automatically to any direction from which the cable is drawn. Owing to the deeply cut concave faces of the guide rollers 25 and 33, these rollers will fit snugly around the circumference of the cable to consequently wear equally upon all sides of the insulation of the cable. Tendency toward flattening of the cable at one side by the said guide rollers will accordingly be reduced to a minimum and since the base 10 of the device is insulated with respect to its support to prevent short circuiting from the cable through the guide, it becomes possible to form the guide rollers of metal and thereby eliminate the undesirable features of wooden rollers as heretofore used.

I, therefore, provide a particularly simple and efficient construction for the purpose set forth and in order to add to the convenience of the user of the guide, I preferably equip the guide with a cable splice. This cable splice is formed of mating channeled blocks 36 and 37 respectively. The block 36 is, at one end, provided with a lateral extension 38 which receives a machine bolt or other suitable fastening device connecting the said block with the upper end of the body of the guide. Upstanding from this block at opposite sides of the channel therein are spaced guide pins 39 and, as will now be particularly observed upon reference to Fig. 1, the block 37 is, at opposite sides of its channel, provided with spaced openings adapted to loosely receive these pins. The ends of a cable to be spliced may thus be placed in the mating channels of the blocks therebetween and the block 37 driven down upon the pins 39 against a suitable splice for the cable for clamping the said splice about the cable ends. Connecting the block 37 with the block 36 is a short length of chain or other suitable flexible element 40 designed to prevent loss of the former block.

Having thus described the invention, what is claimed as new is:

1. A cable guide including a base, a body rotatable thereon, a guide yoke rotatable upon the body at an angle to the axis of rotation of the body, and coacting guide rollers carried by the yoke and body respectively.

2. A cable guide including a base, a body swiveled thereon, a guide yoke swiveled upon the body to turn thereon in a plane at substantially right angles to the plane of movement of the body and formed with a hollow trunnion journaled through the body, spaced guide rollers carried by the yoke at one end of said trunnion, and spaced guide rollers carried by the body at the opposite end of said trunnion.

3. A cable guide including a base, a body axially rotatable thereon, a guide yoke rotatable upon the body and projecting laterally therefrom, and coacting guide rollers carried by the body and yoke respectively.

4. A cable guide including a base provided with a trunnion, a body rotatable upon said trunnion, a guide yoke having a trunnion journaled upon the body at an angle to said first mentioned trunnion for supporting the yoke to turn with respect to the body, and coacting guide rollers carried by the yoke and body respectively.

5. A cable guide including a base, a body rotatable thereon and formed with an opening, a guide yoke having a hollow trunnion journaled through the body for supporting the yoke to turn thereon at an angle to the plane of movement of the body and entering said opening, and coacting guide rollers mounted upon the body at the said opening and upon the yoke respectively and disposed in a plane with the said trunnion.

6. A cable guide including a base, a body rotatable thereon and provided with an opening, confronting arms projecting from the body at one side of said opening, spaced guide rollers mounted between the said arms, a guide yoke having a hollow trunnion journaled through the base in a plane with said guide rollers for supporting the yoke to turn upon the body in a plane at an angle to the plane of movement of the body and entering the said opening, and spaced guide rollers mounted upon the yoke in a plane with said trunnion.

7. A cable guide including a base, a body rotatable thereon, a guide yoke rotatable upon the body at an angle to the axis of rotation of the body, and coacting guide rollers carried by the yoke and body respectively, the said guide rollers being formed with deep cut concave faces to fit around the circumference of a cable.

8. A cable guide including a base, a body rotatable thereon, a guide yoke rotatable upon the body at an angle to the axis of rotation of the body, coacting guide rollers carried by the yoke and body respectively, and means for insulating the base with respect to a support therefor.

9. A cable guide including a base having a trunnion rising therefrom, a body formed with a transverse opening and swiveled upon the said trunnion, the body axially receiving the trunnion to project into the said opening, means connecting the body with the base and engaged with the trunnion within the said opening, a guide yoke swiveled upon the body in a plane at an angle to the plane of movement of the body and provided with a hollow trunnion, spaced guide rollers carried by the yoke at one end of said trunnion, and spaced guide rollers carried by the body at the opposite end of said trunnion.

In testimony whereof I affix my signature.

NEWTON K. BOWMAN. [L. S.]